United States Patent [19]

Winzenz et al.

[11] Patent Number: 4,977,510
[45] Date of Patent: Dec. 11, 1990

[54] COMPUTERIZED CONTROL SYSTEM AND METHOD FOR BALANCERS

[75] Inventors: Wayne L. Winzenz, Manchester; Brian K. Hackett, Saline, both of Mich.

[73] Assignee: 501 Balance Dynamics Corporation, Ann Arbor, Mich.

[21] Appl. No.: 383,925

[22] Filed: Jul. 21, 1989

[51] Int. Cl.⁵ .................. G06F 15/20; G01M 1/16
[52] U.S. Cl. ................... 364/463; 364/508; 364/571.01; 74/573 R
[58] Field of Search ......... 364/463, 508, 550, 571.01; 73/66, 463, 462; 74/573 R, 573 F; 340/825.06

[56] References Cited

U.S. PATENT DOCUMENTS

| | | | |
|---|---|---|---|
| 4,060,707 | 11/1977 | Olsson et al. | 73/66 |
| 4,098,127 | 7/1978 | Shiga et al. | 364/463 |
| 4,432,253 | 2/1984 | Kerlin | 340/825.06 |
| 4,437,163 | 3/1984 | Kurihara et al. | 364/508 |
| 4,535,411 | 8/1985 | Blackburn et al. | 364/508 |
| 4,637,171 | 1/1987 | Menigat et al. | 51/281 R |
| 4,684,944 | 8/1987 | Kerlin | 364/463 |
| 4,817,003 | 3/1989 | Nagase et al. | 364/463 |

Primary Examiner—Parshotam S. Lall
Assistant Examiner—Tyrone Queen
Attorney, Agent, or Firm—Harness, Dickey & Pierce

[57] ABSTRACT

A computerized control system and method is disclosed for controlling a temperature differential balancer associated with a rotating device. The control system utilizes a microprocessor under stored program control which automatically recalibrates the phase angle difference between a vibration signal and a position signal of said rotating device. This difference is then used to define a corrected chamber to be heated or cooled in order to effect the desired device balance.

18 Claims, 6 Drawing Sheets

COMPUTERIZED CONTROL SYSTEM AND METHOD FOR BALANCERS

Field of the Invention

This invention relates to a control system and method for the balancing of a rotating device and more particularly to a computerized control system containing a stored program, wherein the stored program directs the balancing of the rotating device by controlling a temperature differential balancer.

DISCUSSION

Many types of rotating machines, such as grinding wheels, undergo changes in their state of balance as a consequence of normal usage. Many types of balance correction devices have been created which have employed a variety of balancing methodologies and associated control systems in order to correct these changes in balance.

One example of such a balance correction device is that disclosed in U.S. Pat. No. 4,432,253 filed on Jan. 25, 1982 and which is herein incorporated by reference. Generally, U.S. Pat. No. 4,432,253 teaches the use of a change in mass distribution associated with a balancer during its rotation with a rotating device. This change in mass distribution is achieved by heating and vaporizing fluid contained within a chamber of the balancer The vapor is then conducted, by a tube, to another chamber of the balancer where it is subsequently condensed. Electronic vibration and positional measuring means are disclosed, as well as associated control techniques, to determine the chamber and the degree of heating required to improve the state of balance of the rotating device. While these balancers have been found to be extremely useful in the balancing of rotating devices, such as grinding wheels, the aforementioned electronic control associated therewith have contained some drawbacks Specifically, the electronic control associated with many of these past balancers have usually contained a plurality of discrete electronics and have therefore not been easily modifiable or changeable to reflect new and different types of balancing requirements.

Additionally, these electronic control systems have not readily electronically communicated or interfaced with other types of tooling equipment such as numerical controllers, and have usually required manual calibration or alignment of the typical vibration transducer and positional measuring device at balancing system initialization.

Furthermore, many of these electronic control systems have failed to provide a display to a balancing system user in order to inform the user of the state of balance of the rotating device and have also failed to perform automatic testing in order to determine the integrity of the balancer

SUMMARY OF THE INVENTION

It is therefore a primary object of this invention to provide a balancer controller which may be relatively easily modifiable or changeable in order to meet new and different types of rotating device balancing requirements.

It is another object of this invention to provide a balancer controller which is capable of being electronically interfaced and in communication with a plurality of different types of standard tooling equipment.

It is a further object of this invention to provide a balancer controller which calibrates and electronically aligns the signal output of the typical vibration transducer with the signal output of the typical positional measurement device, associated with the balancer, at the initialization thereof.

It is another object of this invention to provide a balancer controller having a display portion being in visual communication with a controller user wherein the display is capable of informing the user of the state of balance of the rotating device and balancer It is a further, and related, object of this invention to provide a balancer controller capable of testing both itself and the balancer in a substantially automatic manner and which is further capable of displaying the result of such testing to a user of such a controller.

According to the teachings of the present invention a microprocessor based controller may be provided which is electronically connected to a typical temperature differential balancer and which controls the selection and heating or cooling of selected balancer chambers in order to effectively balance a rotating device to which the balancer is connected.

The microprocessor may be modifiably programmed to effect different types of balances upon the balancer and to automatically calibrate the phase of the signal output of the vibration transducer relative to the phase of the signal output of the positional reference or pulse generating device.

The microprocessor based balancer controller, in the preferred embodiment of this invention, contains an analog card which electronically communicates with the signal outputs of the vibration transducer and pulse generating positional device and which acts to process and filter these signals before electronically coupling them to the microprocessor.

The balancer controller further contains a local display, electronically coupled to the microprocessor through the analog card and a remote display electronically coupled to the microprocessor through an input-output card.

Both displays allow a balancer user to view the current balance state of the rotating device by reading received data from the microprocessor and further allow system faults and past imbalance history to be viewed.

The input-output card allows typical machine controllers, such as numerical controllers and programmable logic controller to be in interactive communication with the microprocessor and also allows standard output devices, such as slip ring or center point devices, to be controlled by the microprocessor Further objects, features and advantages of the invention will become apparent from a consideration of the following description and the appended claims when taken in connection with the accompanying drawings

BRIEF DESCRIPTION OF THE DRAWINGS

Various advantages of the present invention will become apparent to those skilled in the art by reading the following specification and reference to the following drawings in which.

DETAILED DESCRIPTION OF THE INVENTION

Figure 1:
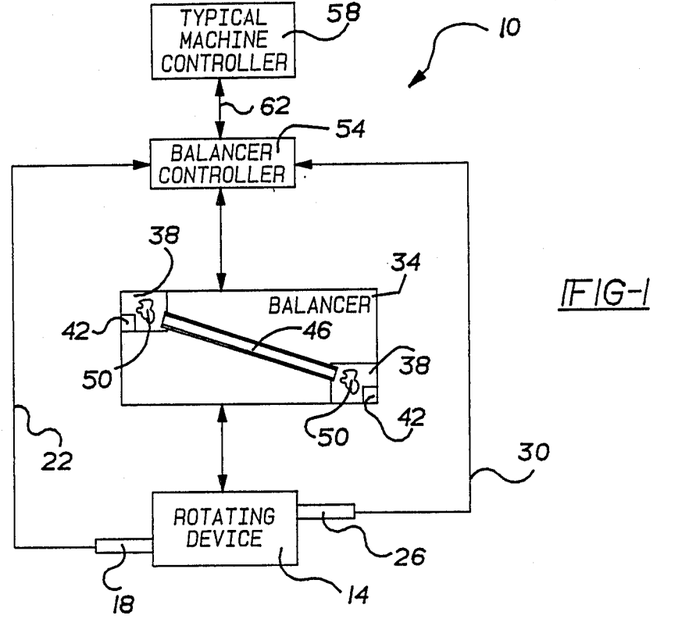
FIG. 1 is an illustration of the interfacing of a balancer controller, made in accordance with the teachings of the preferred embodiment of this invention, relative to a typical rotating device and balancer.

Referring now to FIG. 1, there is shown a block diagram of the placement of a balancer controller, made in accordance with the teachings of the preferred embodiment of this invention, within a typical balancing system associated with a rotating device. Specifically, rotating device 14 may be of one of a plurality of types which includes grinders, high speed lathes, and centrifuges These types of rotating devices require frequent rebalancing due to such factors as their characteristic resonant frequency and physical changes caused by their use.

Usually, these devices have a typical vibration transducer 18 mounted upon their outside housing. Vibration transducer 18 provides the usual sinusoidal output signal on line 22 whose frequency corresponds to the approximate rotational frequency of the device 14 and whose peak amplitude is generally indicative of the magnitude of vibration associated with the rotating device 14. Typical position sensor 26 is also usually mounted to the outside housing of device 14 and provides an output signal on line 30 which is usually generally indicative of the approximate position of device 14 during its rotation It is known that the phase of signal on line 22 is generally indicative of the location of imbalance upon device 14. The phase of signal on line 22 is normally measured with reference to the phase of signal on line 30.

Typical balancer 34 is, in the preferred embodiment of this invention, of the temperature differential type and as such usually contains a plurality of chambers 38 in which a heating element 42 is in association therewith. Chambers 38 are usually mechanically interconnected by transport tube 46 and usually contain a quantity of vaporized material 50 such as Freon or the like.

To effect balance of device 14, material 50 is usually vaporized by a single heating element 42 and made to be transported, in a vaporized state, to a different chamber 38, from that which it was currently residing, by use of tube 46. This movement of material 50 within balancer 34 typically causes imbalance associated with device 14 to be corrected since balancer 34 and device 14 are mechanically connected. To effect balance in this manner, however, it is known to be critical to select the proper chamber to be heated since the mass must move to a very precise location within balancer 34 to effect the desired balance of device 14.

This knowledge (of the correct chamber to deposit mass 50 within) may usually only be gained with the knowledge of the exact location of imbalance upon device 14. Further, the effects of residual heat must also be factored into the correction process.

That is, the vaporization of material 50 by heater 42 does not stop at the exact moment that heater 42 is deactivated. Residual heat, present within the heated chamber 38, will continue to vaporize material 50 after heater 42 is turned off and will thusly cause a greater amount of material 50 to be deposited within the target chamber 38. To effectively counter this residual heating phenomenon, it is known that the heater 42 must be deactivated at a calculated time before all of the desired mass 50 has been vaporized.

Balancer controller 54, made in accordance with the teachings of the preferred embodiment of this invention, is electronically connected to balancer 34 and generally controls heating elements 42 based upon information contained within signals on lines 22 and 30. Physically, controller 54 may be remotely located from balancer 34 and rotating device 14 or it may alternatively be mechanically connected thereto. Further, controller 54 may be used to control a temperature differential balancer which employs cooling elements instead of the traditional heating elements 54.

Controller 54 may also be electronically connected to a typical machine controller 58 such as a typical programmable logic controller or numerical controller. Electronic signals for controller 58 are received on signal on line 62 and act so as to direct balancer controller 54 to perform a change in the distribution of mass 50 within balancer 34 in the manner previously specified.

Figure 2:
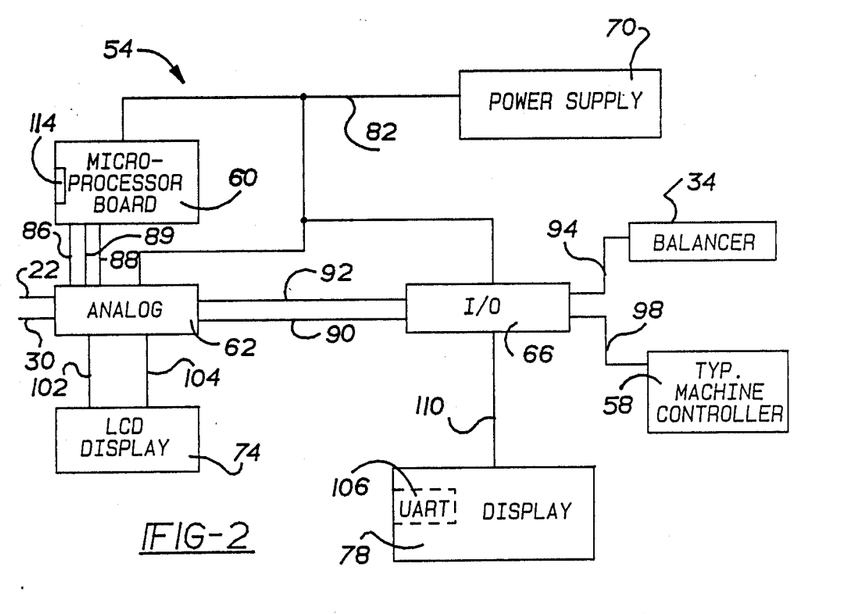
FIG. 2 is a block diagram of the balance controller shown in FIG. 1.

Balancer controller 54 is generally shown in greater detail in FIG. 2 as containing a microprocessor board 60, analog card 62, input-output card 66, power supply 70, liquid crystal display unit 74 and a remote display unit 78.

In the preferred embodiment of this invention, power supply 70 is of the 110 volt/15 watt variety and supplies either +5 volts and +12 volts of power to microprocessor board 60, analog card 62, and input-output card 66 through power bus 82. Supply 70, in the preferred embodiment of this invention, is manufactured by the Shindengen Electric Manufacturing Company located in Toyko, Japan and is referenced by model number EYG 150/01.

Microprocessor board 60 is generally used to store and create a software control program which causes board 60 to control analog card 62 through a signal on line 86 and receives data from card 62 through signals on lines 88 and 89. Board 60 controls input-output card 66 through signal on lines 90 and 92 which electronically connects input-output card 66 to analog card 62. Analog card 62 receives input signals on lines 22 and 30 and generally determines the vibration level, speed, and phase of vibration associated with device 14 and inputs this information to board 60 through signals on lines 88 and 89. Card 62 transmits data to display 78 by signals on lines 102 and 104 and to display 74 by line 110. The transmitted data is received from board 60 by signal on line 86.

Input-output card 66 may be of a plurality of varieties (such as the usual slip ring or center point type) and serves to output balancer control commands received upon signals on lines 90 and 92 to balancer 34 by signals on line 94. Additionally, typical machine controller 58 may alternatively input balancer control information or commands by signals on line 98 which is received by input-output card 66 and subsequently sent to microprocessor board 58 by means of signals on lines 90, 92 and 86 and analog card 62.

Display 74 is of the liquid crystal type, in the preferred embodiment of this invention, and is manufactured by Seiko located in Tokyo, Japan. Display 74 is referred to as model number L2012. Display 74 is electronically connected to analog card 62 by signals on lines 102 and 104 and is generally used to display status information associated with controller 54, balancer 34, and rotating device 14. Display 74, in the preferred embodiment of this invention, is physically located within controller 54.

Remote display device 78 contains a universal asynchronous receiver-transmitter (uart) portion 106 which is, in the preferred embodiment of this invention, an industry standard ADC31 type. Display 78 contains status information similar to that of display 74 and is of substantially the same type. Display 78 is electronically connected to input-output card 66 by signal on line 110 which allows such status information to be received thereto and is remotely located from controller 54.

To further allow a remote display of the status of controller 54, balancer 34, and rotating device 14, microprocessor board 58 contains the usual computer communications port 114. Port 114 substantially adheres to the RS-232C industry communication standard and allows a computer device, also adhering to this standard, to be electronically interfaced thereto and to obtain the aforementioned status information from the microprocessor 58 in the usual manner Referring now to FIG. 3, it is shown that microprocessor board 60 contains a microprocessor 118, read only memory 122, random access memory 126, battery backed up random access memory 130, serial output port 134, address decoder 138, and wait state generator 142. Elements 118-142 are electronically interconnected by bus 146 which has a sixteen bit data communication capacity Microprocessor 118 is manufactured by the Intel Corporation of Palo Alto, Calif. and is referenced by model number 80C196KB Microprocessor 118 controls the entire operation of controller 54 and contains the previously defined communications port 114. Microprocessor 118 further has the usual analog to digital convertor integrated therein and is therefore electronically connected to external voltage source 148 of approximately +5.2 volts in order to establish the necessary reference voltage. Additionally, microprocessor 118 receives the previously defined signal on line 86 from analog board 62.

Figure 3:
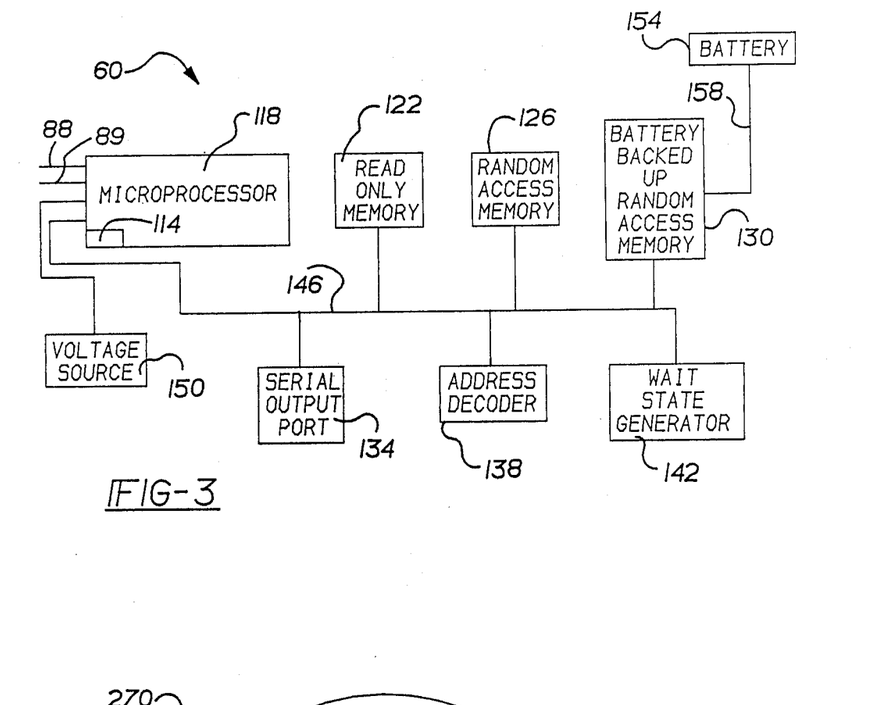
FIG. 3 is a block diagram of the microprocessor board shown generally in FIG. 2.

Memory 122 is a standard read only memory and, in the preferred embodiment of this invention, contains substantially all of the software program used by microprocessor 118 to effect its aforementioned control function and has a capacity of approximately 32,000 data words.

Memory units 126 and 130 are typical random access memories having a capacity of approximately 8,000 data words each with unit 130 also being backed up by electrical battery 154 in the usual manner through the usual power bus 158. Memory units 126 and 130 are generally used to store variables associated with the computer program contained within memory 122. Memory unit 130 specifically stores relatively unchanging system variables while unit 126 stores temporary variables.

Port 134 is of the standard serial output type and, in the preferred embodiment of this invention, is manufactured by the Intel Corporation and is referred to as a model 82510. Decoder 138 is a typical address decoder and generally decodes the data messages placed upon bus 146 in order to properly determine the destination of the message. Each element 118-142 has the usual unique address associated therewith in order to be uniquely selected Wait state generator 142 is a typical generator and is used in order to allow serial output port 134 to access bus 146 even though it is typically slower than the other elements and 138. Generator 142 creates the usual single wait state in order to allow this access Referring now to FIG. 4, there is illustrated analog card 62. Specifically card 62 contains amplifiers 170 and 174, analog switches 178 and 182, integrator 186, low pass filter 190, gain selective amplifier 194, digital filter 198, clock 202, signal conditioner 206, parallel output registers 210 and 214, and digital to analog convertors 218 and 222.

Figure 4:
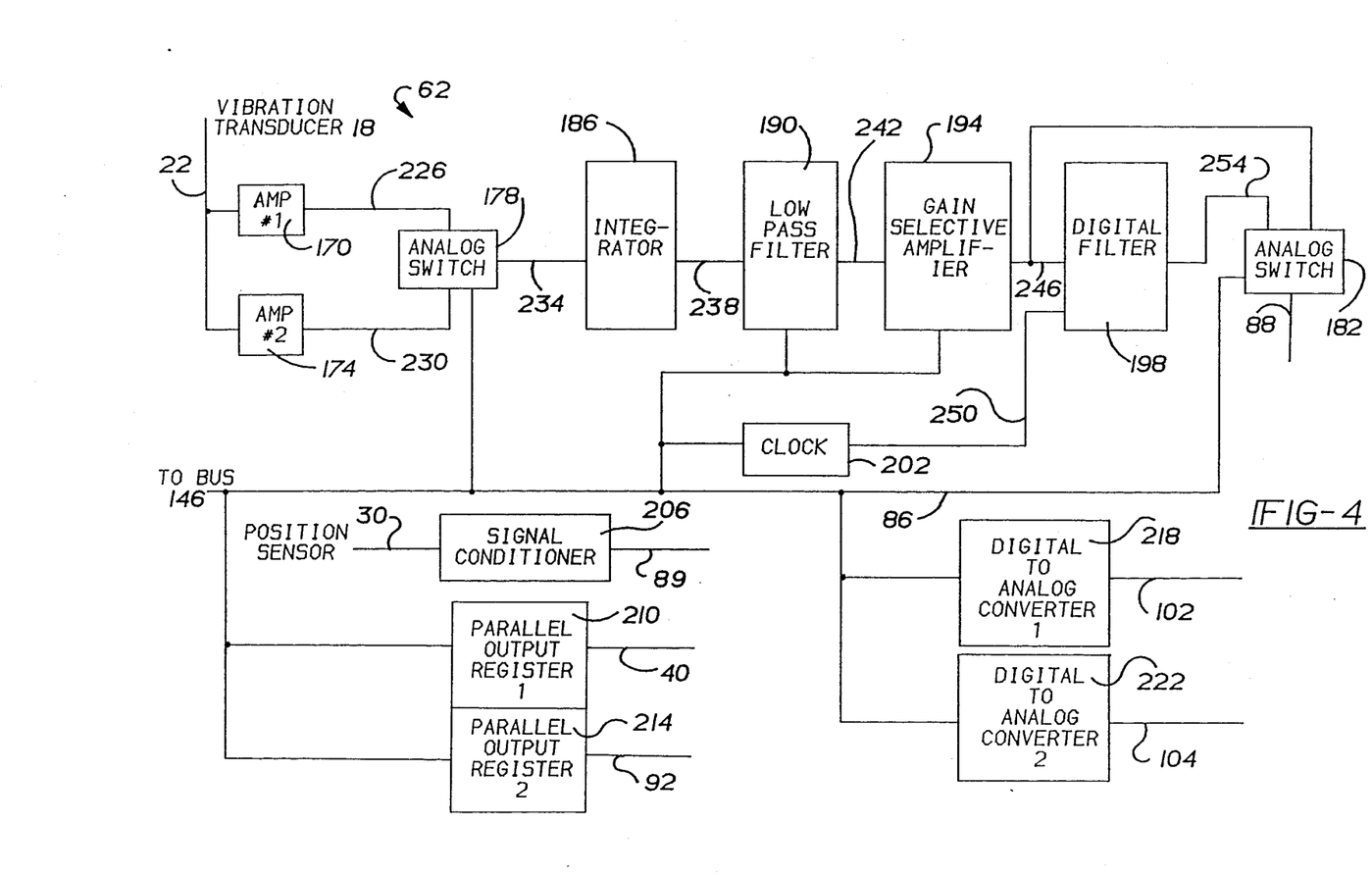
FIG. 4 is a block diagram of the analog board shown generally in FIG. 2.

In the preferred embodiment of this invention, signals on line 22, from vibration transducer 18, may be electronically connected to either amplifier 170 or 174. Alternatively, two different vibration transducers 18 may be employed upon rotating device 14 in order to achieve higher fault tolerance of system 10 or to insure greater accuracy of controller 54. Amplifiers 170 and 174 increase the amplitude of signals on line 22 in order for card 62 to effect further processing upon it and, in the preferred embodiment of the invention, amplifiers 170 and 174 are manufactured by Motorola, Incorporated and are referred as model number 3404.

Amplifiers 170 and 174 produce output signals on lines 226 and 230 respectively. Lines 226 and 230 are input to switch 178 which is manufactured by Motorola, Inc. and is referred to as model number 4053. Switch 178 selects either the signals on line 226 or signal on line 230 and places the selected signal upon output line 234 to integrator 186. Such selection is defined by microprocessor 118 through signals on bus 86.

Integrator 186, in the preferred embodiment of this invention performs standard mathematical integration upon signals on line 234 in order to convert the signals to a measure of displacement upon rotating device 14. In the preferred embodiment of this invention, integrator 186 is manufactured by National Semiconductor, Incorporated and is referred to as model number LM324. Integrator 186 produces an output signals upon line 238 which is electronically coupled to filter 190.

Filter 190 eliminates high frequency components of signals on line 238 in order to ensure accuracy of digital filter 198. In the preferred embodiment of the invention, filter 190 is manufactured by National Semiconductor, Incorporated and is referred to as model number LM324. Filter 190 may assume a narrow band personality in which frequency components, associated with signal on line 238 below approximately 6khz are filtered out. Filter 190 may also assume a wide band personality in which frequency components, associated with signal on line 238, below approximately 20khz are eliminated. The personality of filter 190 is defined by microprocessor 118 by signals on line 86.

Filter 190 produces filtered signal output on line 242 to gain selective amplifier 194 which, in the preferred embodiment of this invention, is manufactured by National Semiconductor, Incorporated and incorporates one standard model DAC0832 converter and two standard model LF 353 linear amplifiers in a co-operative electrical coupling arrangement. Amplifier 194 amplifies signals on line 242 by the amount specified by signals on line 86 and produces an output signal on line 246 to digital filter 198.

Filter 198, in the preferred embodiment of this invention is a standard filter manufactured by Maxim Incorporated and is referred to as a model Max 260. Filter 198 also has an input signal on line 250 from clock 202 which is a standard time of day clock manufactured by Motorola, Incorporated and is referred to as model number 146818A.

Signals on line 250 assume values of approximately 1024, 2048, 4096 and 8192 and which are specified by microprocessor 118 through signal on line 86 and which act to specify the center frequency of filter 198. In the preferred embodiment of this invention, filter 198 is normally made to select the desired displacement or vibration level including the associated phase angle upon the specific rotating speed of device 14. Specifically, filter 198 outputs a sine wave whose amplitude is substantially equal to the vibration level of the device 14. This output is placed upon signal line 254 and is input to analog switch 182. The amplitude and phase angle of imbalance is derived from signals on line 254 by microprocessor 118 using standard techniques such as discrete Fourier transformations. Signal on line 246 are also input to switch 182 which is substantially similar to switch 178 and which produces an output signal on line 88 which is substantially similar to either signal on line 254 or 246. This similarity is defined by microprocessor 118 through signals on line 86.

If the signal on line 88 is similar to the signal on line 254, then microprocessor 118 may utilize this aforementioned vibration level and phase information to control balancer 34 through a signal on line 94. If the signal on line 88 is similar to the signal on line 246, then microprocessor 118, via a signal on line 88, uses the signal on line 246 to look at multiples of the speed of rotation of device 14 in order to perform standard system 10 diagnostics.

The signal on line 30 is input to a usual signal conditioner 206 which, in the preferred embodiment of this invention, is a typical Schmidt trigger optoisolator and is referred to as standard industrial model GEH11L1. Conditioner 206 outputs signals on line 89 to microprocessor 118 and substantially represents the speed in "revolutions per minute" associated with rotating device 14.

Signals on line 86 are also electronically connected to bus 146 and this interconnection allows microprocessor 118 to control switches 178 and 182, filter 190, amplifier 194, and clock 202. Additionally, parallel output registers 210 and 214 are electronically connected to line 86 and, in the preferred embodiment of the invention, are standard eight bit parallel output registers manufactured by National Service conductor, Incorporated and are both referred to as models 744C241. Registers 210 and 214 produce signals on lines 90 and 92 respectively to input-output card 66 which allows microprocessor 118 to control card 66 and a temperature differential balancer 34.

Also electronically connected to signal line 86 are standard digital to analog convertors 218 and 222 which process twelve bits and three bits of data respectively. In the preferred embodiment of this invention, convertor 218 is manufactured by Maxim, Incorporated and is referred to as model AD7542. Converter 214 comprises three resistors, arranged in a standard parallel fashion, having values of 10K, 20K, and 40K ohms respectively.

Converter 218 produces an analog output signal on line 102, in response to information received from microprocessor 118, which has a varying level of zero to positive ten volts and which represents a vibration level of device 14 to display 74. Converter 222 produces an analog output signal on line 104 which, in response to information received from microprocessor 118, has a varying level of zero to positive six volts and which indicates where the imbalance upon rotating device 14 is located relative to a subdivided area thereon. Signals on line 102 and 104 are both connected to display 74.

Figure 5:
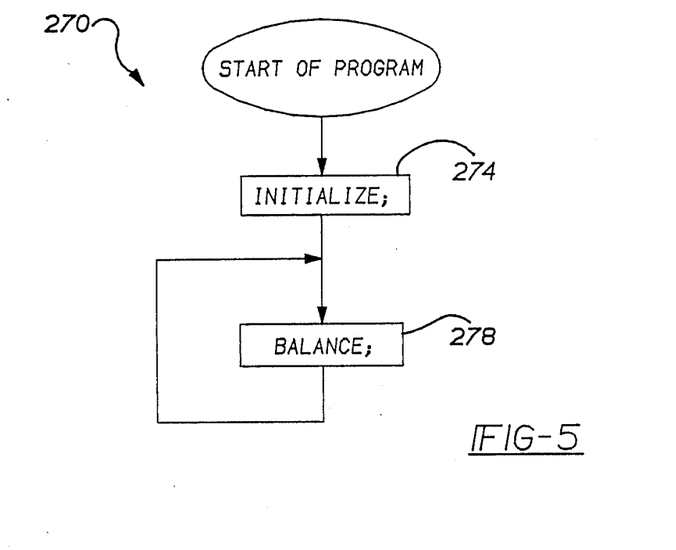
FIG. 5 is a flow chart showing the general operation of the software program contained within the microprocessor illustrated in FIG. 3.

In order to more fully understand the balancing and calibration functionality associated with microprocessor 118, a detailed discussion will now be provided relative to the stored software program contained therein. Referring now to FIG. 5, there is shown an overall flow chart 270 associated with the software states associated with microprocessor 118.

To begin, microprocessor 118 is placed, by its contained software program, into an initialization routine 274 and subsequently placed into a balancing routine 278. Balance routine 278 is continually representative of the functionality associated with microprocessor 118, after the initialization routine 274 phase been completed, unless system 54 is made to be deactivated by the turning off of power supply 70 or other various types of usual computer system faults such as faulty electrical components and/or wiring associated therewith.

Figure 6:
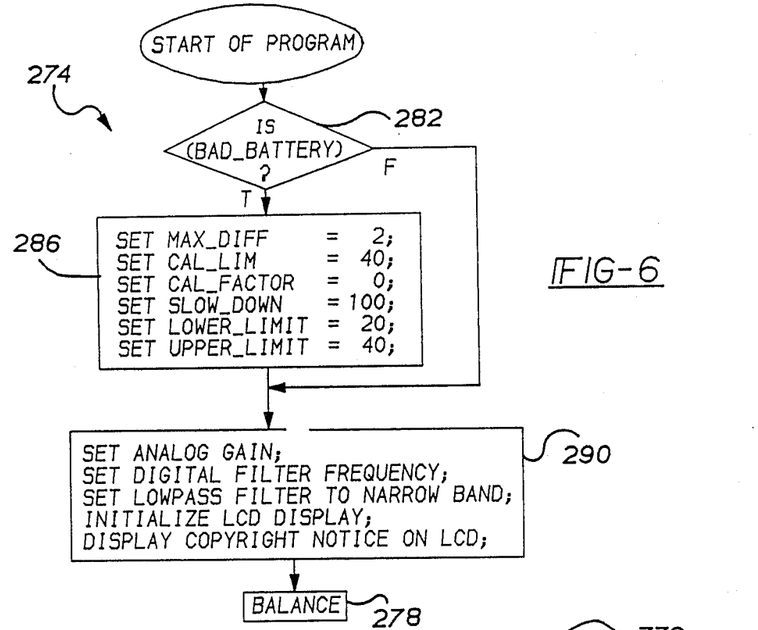
FIG. 6 is a flow chart showing the sequence of steps comprising the initialization software routine shown generally in FIG. 5.

Referring now to FIG. 6, it is shown that initialize software routine 274 defines steps 282–290. At step 282, microprocessor 118 determines if power supply 70 is operational by monitoring the electric voltage potential associated with signal on line 82 and comparing this monitored value with a stored value to determine if the power supply 70 has failed. It should be noted that this stored value of power supply 70 is relatively unchanging and hence is stored in memory 130 so as to not be affected by a failure to powers supply 70.

If the power supply 70 has been determined to be faulty then step 286 is entered into and requires that the variables "max_diff" be approximately equal to 2, "cal_lim" be approximately equal to 40, "cal_factor" be approximately equal to 0, "slow down" be approximately equal to 100, "lower limit" be approximately equal to 20, and "upper_limit" be approximately equal to 40. These variables will be utilized within balance routine 278 and will be hereinafter explained. After step 286 has been completed, or if power supply 70 was not found faulty, within step 282, then step 290 is entered into.

Step 290 requires that microprocessor 118 set the gain associated with amplifier 194 in order to produce an amplified signal on line 246, center frequency of filter 198 through clock 202, set filter 190 to narrow band, and initialize and display a copyright notice on display 74 through convertors 218 and 222. Microprocessor 118 performs these functions through signals on line 86. After step 290 has been completed, microprocessor 118 enters balance routine 278.

Figure 7A:
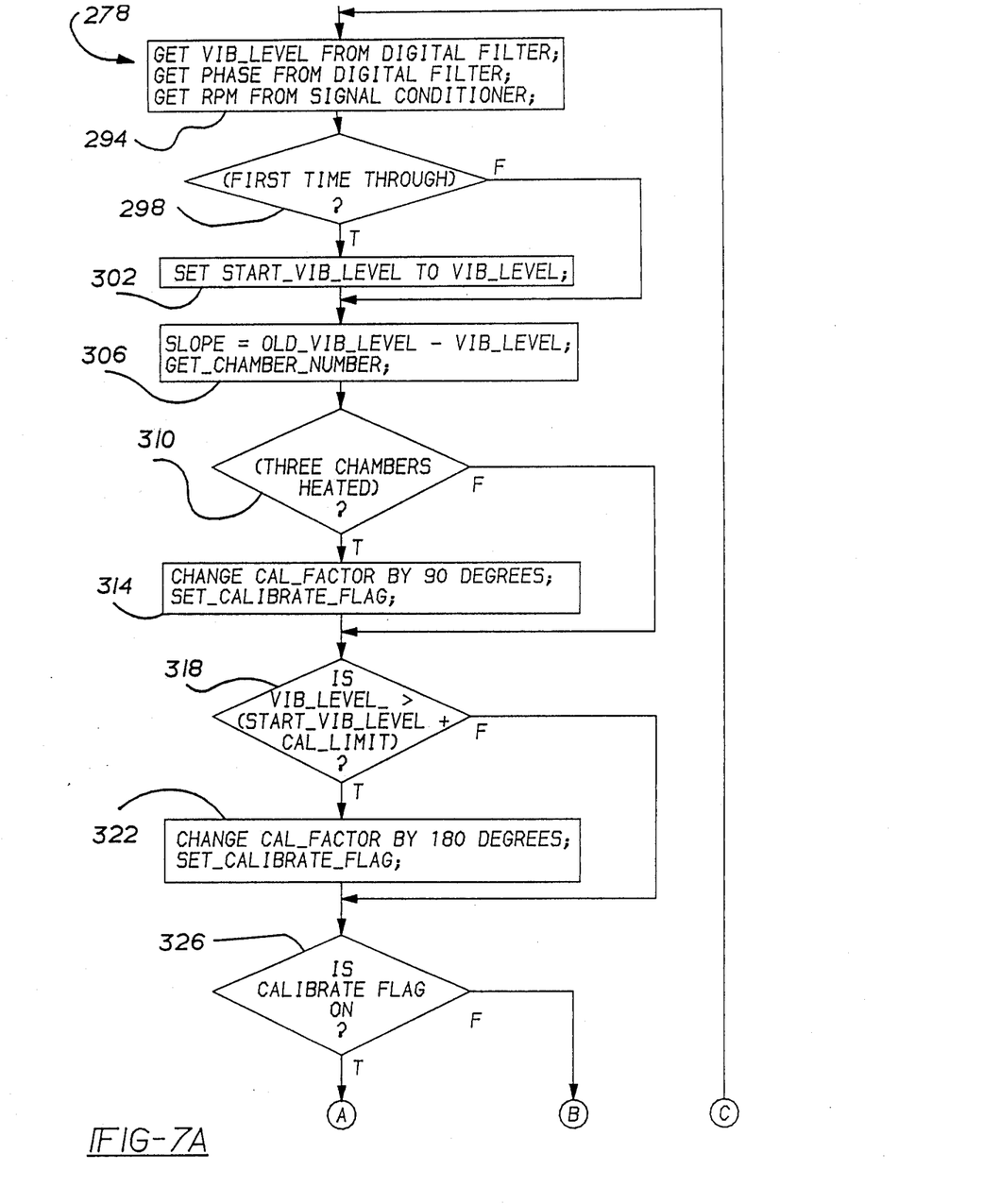
FIGS. 7(a) and (b) are flow charts showing the sequence of steps comprising the balancer software routine shown generally in FIG. 5.
Figure 7B:
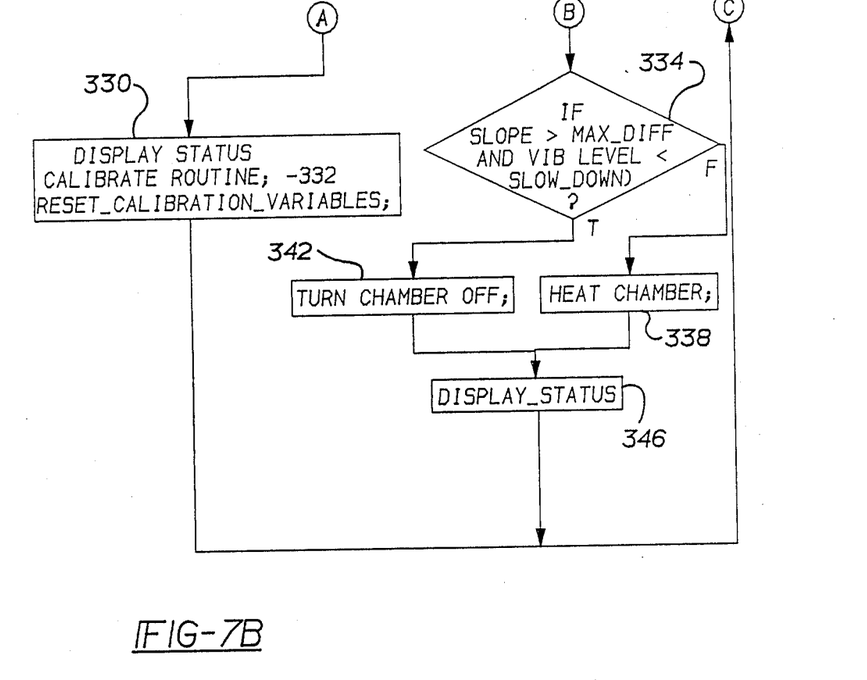

As shown in FIGS. 7(a) and (b), balance routine 278 comprises steps 294–346. Initially step 294 requires that microprocessor 118 obtain the vibration level and phase angle of imbalance which is obtained from signals on line 88 and also obtain the speed of the rotating device 14 which is determined by the signal on line 89.

Next, step 298 requires microprocessor 118 to inquire as to whether or not this is the first time that step 298 has been entered into after the latest initialization step 290 has been completed. If it is such a fist time, step 302 is entered into and if it is not step 302 is bypassed.

Step 302 requires that the variable "start₁₃vib—level" which is stored in memory 126 by set substantially equal to the vibration level associated with the signal on line 88. This "start—vib—level" variable is used for latter imbalance pattern analysis for use by displays 74 and 78 and in step 318. The vibration level associated with signal on line 88 is stored in the "vib—level" variable within memory 126.

Step 302 also requires that all vibration level readings from signal on line 88 which are represented by the "vib—level" variable be sequentially shifted into an "Old—vib—level" variable upon a new reading of signal on line 88. A value currently represented by the "old—vib—level" variable is also disposed of upon the shifting in of a new value. The "old—vib—level" variable is stored in memory 126.

After step 302 has been completed, or bypassed, step 306 is entered and requires the calculation of vibration level slope by subtracting the current value of the "vib—level" variable from the current value of the "old—vib—level" variable and the storing of this difference in the "slope" variable within memory 126. This calculation gives an indication of the vibration level trend of device 14. Additionally, step 306 requires that the chamber 38 to be heated be identified by the phase angle associated with signal on line 88 and that this chamber be stored within memory 126 in the "chamber—number" variable.

Step 310 is then entered into and requires the determination if three chambers 38 have previously been heated (or cooled) before the entering of this step If three chambers 38 have been heated (or cooled), it has been found that the imbalance upon rotating device 14 has not been accurately determined due to a typical phase shift of signal on line 88 relative to signal on line 89.

To counteract or negate this phase shift identified by the heating or cooling of three chambers 38 at this point, step 314 requires the change of the previously set "cal—factor" variable by 90° and the setting of "set—calibration—flag" variable normally stored in memory 126. It should be noted, at this point, that initially setting "cal—factor" to zero in step 286 defined the phase difference between a full phase of sinusoidal signal on line 88 and signal on line 89 to be essentially zero degrees, and that a change in the "cal—factor" variable essentially defines a correction angle that must be used in order to properly align these electronic signals 88 and 89. This is extremely important in identifying the imbalance since the phase angle of signal on line 88 relative to the phase angle of signal on line 89 is used to determine imbalance location Additionally, every chamber 38 has a unique phase of signal 88 associated with it.

Step 318 is entered after step 314 has been completed or is bypassed and requires that the "vib—level" variable be compared to the mathematical addition of the value of the "start—vib—level" variable and the previously defined "cal—limit" variable of step 286. The "cal—limit" variable thusly defines how severe the vibration may be before it is corrected. Step 318 thusly determines if the vibration level of rotating device 14 is getting too severe and must be corrected for.

It should be noted, at this point, that all of the previously defined variables of step 286 may be programmed to be of substantially any value designated and that the "set lower—limit" and "set upper—limit" variables really define the range of values that "cal—limit" may have.

If the value of "vib—level" is greater than the aforementioned summation of step 318, then step 322 is entered and which requires a change in the "cal—factor" variable by 180degrees in order to select a correct chamber 38 for heating. Step 322 also requires that the "calibrate—flag" variable be set.

Step 326 is entered upon the completion or the bypass of step 322 and requires microprocessor 118 to determine if the "calibrate—flag" variable has been set by reading its memory location 126. If the "calibrate—flag" variable has been set, then step 330 is entered which requires a display of the calibrate status to displays 74 and 78 through signals on lines 86, 90–92 and 110 and through signals on lines 86 and 102–104 respectively.

Figure 8:
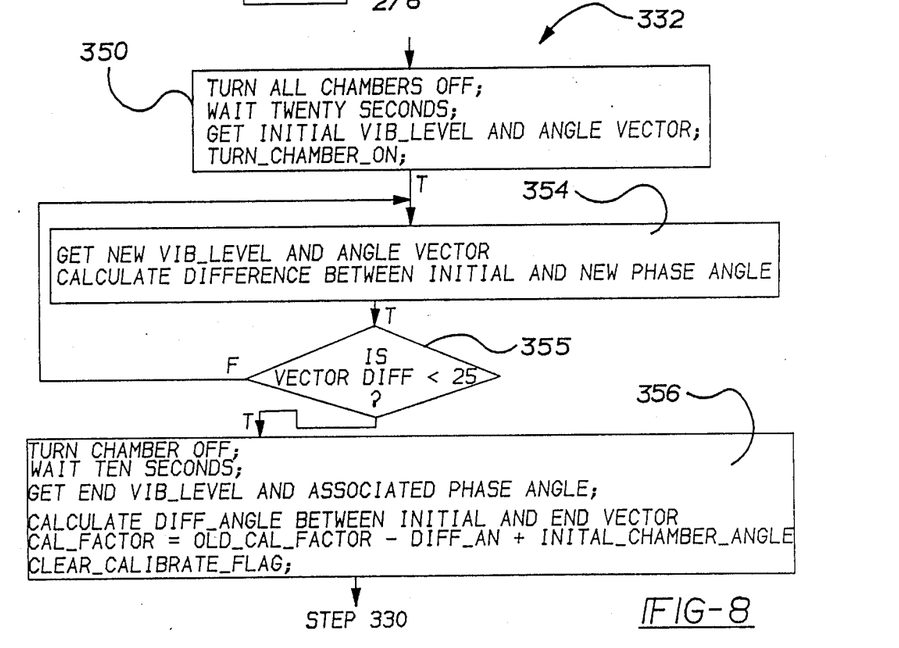
FIG. 8 is a flow chart showing the sequence of steps comprising the calibrate software routine shown generally in FIGS. 7(a) and (b).

Step 330 also requires that a calibration routine 332 be entered which is best shown in FIG. 8 as comprising steps 350–356. Initial step 350 of routine 332 requires that microprocessor 118 deactivate all of heating (or cooling) elements 42 through signals on line 90–92. Microprocessor 118 then waits approximately twenty seconds (however this waiting length may be of a programmable value) and then obtains the current vibration level value and associated phase angle of signal on line 88 and activates the specified chamber 38 relative to the initial "cal—factor" variable being modified according to steps 314 and/or 322.

Next, step 354 requires microprocessor 118 to obtain the new vibration levels after heating, from the signal on line 88 and to calculate the difference between the new and initial phase angles values of the respective vibration levels. Step 354 is processed while this difference is under 25 or some other programmed value.

When this phase angle difference is greater than 25, step 356 is entered requiring that the heating (or cooling) element 42 of selected chamber 38 of step 350 be deactivated and that approximately ten seconds, or some other programmed time interval elapses. After this interval, microprocessor 118 is directed to obtain the new vibration level and phase angle associated with the signal on line 88 and to mathematically calculate the difference between the phase angles associated with their new vibration level and that found in step 350.

Next, step 356 requires that the new "cal-factor" variable be set approximately equal to the old value of "cal—factor" minus this difference angle (calculated in step 356) plus the phase angle associated with the initial chamber 38 selected in step 350. Finally, the "cal—flag" variable is cleared and step 330 lastly requires the resetting of all of the aforementioned variables associated with routine 332 before control is returned to step 294.

If, in step 326, the calibrate flag is off, then step 334 is entered and requires a determination if the variable "slope" is greater than the variable "max—diff" and if, at substantially the same time, the variable "slow—down" is greater than the variable "vib—level". Both the variables "slow—down" and "slope" are stored in memory location 130 and have previously been defined in step 286. The variables "max—diff" and "slow—down" then are used to determine if temperature differential balancing is required.

If the aforementioned determination associated with step 334 is true, then step 342 is entered, which requires that any previously selected heating element 42 of chamber 38 be deactivated. If the determination of step 334 is false, then step 338 is entered and which requires that the chamber 38 selected in step 306 be heated.

Steps 342 and 338 both terminate into step 346 which requires a display of the status of either steps 342 or 335 upon displays 74 or 78. Upon completion of step 346, control is passed back to step 294.

It should be appreciated by one of ordinary skill in the art that microprocessor 118 may be additionally programmed to store the "store_vib_line" and all of the vibration levels and calibration factor corrections associated with balancing routine 278 in order to give a system user a historical display of imbalance information. Additionally, controller 54 may be programmed to display faults which it has encountered during communications with components within system 10 and thusly may perform automatic fault testing and acknowledgement by use of displays 74 and 78.

It is to be understood that the invention is not limited to the exact construction or method illustrated and described above, but that various changes and modifications may be made without departing from the spirit and scope of the invention as defined in the following claims.

What is claimed is:

1. A method for controlling a balancer for a rotating device, said balancer containing a plurality of chambers each having a selectably activated or deactivated heating element and a unique phase angle therewith, said rotating device having a vibration transducer and a position sensor disposed thereon, said vibration transducer and position sensor each having a signal output defining a position and a vibration level of said rotating device respectively, said signal outputs each having a phase angle associated therewith, said method comprising:

obtaining initial vibration level and position signals and their associated phase angles;

defining an initial calibration factor to be approximately zero;

determining if said heating elements of said plurality of chambers have been selectably activated;

creating a different calibration factor by adding approximately ninety degrees to said initial calibration factor;

selecting one of said heating elements by use of said different calibration factor;

obtaining a current vibration level signal and associated phase angle;

activating said selected heating element;

measuring new vibration level and position signals and their associated phase angles;

deactivating said selected heating element; and creating a modified calibration factor by modifying said different calibration factor whereby said modified calibration factor substantially reflects a difference between said phase angles of said new vibration level and position signals.

2. The method of claim 1 further comprising: storing said modified calibration factor.

3. The method of claim 1 further comprising: displaying said modified calibration factor.

4. The method of claim 1 further comprising:

establishing a maximum allowable vibration level associated with said signal output of said vibration transducer;

determining if said vibration level of said signal output of said vibration transducer exceed said maximum allowable vibration level; and adding approximately one hundred and eighty degrees to said different calibration factor.

5. The method of claim 1 wherein said step of modifying said different calibration factor comprises:

waiting a programmable length of time after said heating element has been deactivated;

measuring said vibration level signal and associated phase angle upon completion of programmable length of time;

creating a difference angle by calculating an angular difference between said phase angle associated with said vibration level measured upon completion of said programmable length of time and said phase angle associated with said current vibration level; and defining said modified calibration factor by subtracting said angular difference from said different calibration factor and adding said phase angle associated with a chamber associated with said selected heating element.

6. A method for controlling a balancer for a rotating device, said balancer containing a plurality of chambers each having a selectably activated or deactivated heating element and a unique phase angle associated therewith, said rotating device having a signal output defining a position and a vibration level of said rotating device respectively, said outputs each having a phase angle associated therewith, said method comprising:

obtaining initial vibration level and position signals and their associated phase angles;

defining an initial calibration factor to be approximately zero;

establishing a maximum allowable vibration level associated with said signal output of said vibration transducer;

determining if said vibration level of said signal output of said vibration transducer exceeds said maximum allowable level;

creating a different calibration factor by adding approximately one hundred and eighty degrees to said initial calibration factor;

selecting one of said heating elements by use of said different calibration factor;

obtaining a current vibration level signal and associated phase angle;

activating said selected heating element;

measuring new vibration level and position signals and their associated phase angles;

deactivating said selected heating element; and creating a modified calibration factor by modified calibration factor substantially reflects a difference between said phase angles of said new vibration level and position signals.

7. The method of claim 6 further comprising: storing said modified calibration factor.

8. The method of claim 6 further comprising: displaying said modified calibration factor.

9. The method of claim 8 further comprising:

determining if three difference heating elements have been selectably activated; and adding approximately ninety degrees to said different calibration factor.

10. The method of claim 6 wherein said step of modifying said different calibration factor comprises:

waiting a programmable length of time after said heating element has been deactivated;

measuring said vibration level signal and associated phase angle upon completion of programmable length of time;

creating a difference angle by calculating an angular difference between said phase angle associated with said vibration level measured upon completion of said programmable length of time and said phase angle associated with said current vibration level; and defining said modified calibration factor by subtracting said angular difference from said different calibration factor and adding said phase angle associated with a chamber associated with said selected heating element.

11. A method for controlling a balancer for a rotating device, said balancer containing a plurality of chambers each having a selectably activated or deactivated heating element and a unique phase angle therewith, said rotating device having a vibration transducer and a position sensor disposed thereon, said vibration transducer and position sensor each having a signal output defining a position and a vibration level of said rotating device respectively, said signal outputs each having a phase angle associated therewith, said method comprising:

obtaining initial vibration level and position signals and their associated phase angles;

defining an initial calibration factor to be approximately zero;

determining if said heating elements of said plurality of chambers have been selectably activated;

creating a different calibration factor by adding approximately ninety degrees to said initial calibration factor;

establishing a maximum allowable vibration level associated with said signal output of said vibration transducer;

determining if said vibration level of said signal output of said vibration transducer exceed said maximum allowable vibration level;

adding approximately one hundred and eighty degrees to said different calibration factor;

selecting one of said heating elements by use of said different calibration factor;

obtaining a current vibration level signal and associated phase angle;

activating said selected heating element;

measuring new vibration level and position signals and their associated phase angles;

deactivating said selected heating element; and creating a modified calibration factor by modifying said different calibration factor whereby said modified calibration factor substantially reflects a difference between said phase angles of said new vibration level and position signals.

12. The method of claim 11 further comprising: storing said modified calibration factor.

13. The method of claim 11 further comprising: displaying said modified calibration factor.

14. The method of claim 11 wherein said step of modifying said different calibration factor comprises:

waiting a programmable length of time after said heating element has been deactivated;

measuring said vibration level signal and associated phase angle upon completion of programmable length of time;

creating a difference angle by calculating an angular difference between said phase angle associated with said vibration level measured upon completion of said programmable length of time and said phase angle associated with said current vibration level; and defining said modified calibration factor by subtracting said angular difference from said different calibration factor and adding said phase angle associated with a chamber associated with said selected heating element.

15. A balance controller for controlling a rotating device balancer, said balancer containing a plurality of chambers having a selectably activated or deactivated heating element and a unique phase angle associated therewith, said rotating device having a vibration transducer and a position sensor disposed thereon, said vibration transducer and position sensor each having a signal output defining a position and a vibration level of said rotating device respectively, said signal outputs each having a phase angle associated therewith, said balance controller comprising:

microprocessor means for calculating a difference in said phase angles associated with said position and vibration signals and for selecting one of said heating elements to be activated by use of said calculated difference in said phase angles;

analog circuit means, having an input electronically coupled to said signal outputs of said sensor and transducer and having an output electronically coupled to said microprocessor means and to a machine controller for conditioning and filtering said signal outputs; and display means, electronically coupled to said output of said analog circuit means, for displaying said selected heating element and for displaying said difference in phase angles.

16. The controller of claim 15 further comprising:

controller means, electronically coupled to said output of said analog circuit means, for allowing said machine controller to receive said conditioned and filtered signal outputs.

17. The controller of claim 15 wherein said analog circuit means comprising:

(a) first amplifier means, having an input electronically coupled to said signal output of said vibration transducer and an output, for amplifying said signal output;

(b) integrator means, having an input electronically coupled to said output of said amplifier means and an output, for integrating said output of said amplifier means and for producing an associated integrated output signal;

(c) low pass filter means, having an input electronically coupled to said output of said integrator means and an output, for eliminating high frequency components of said integrated output signal and for producing an associated output signal;

(d) second amplifier means, having an input electronically coupled to said output signal of said low pass filter means and an output, for amplifying said output signal of said low pass filter means; and (e) digital filter means, having an input electronically coupled to said output of said second amplifier means for producing a sinusoidal signal output wherein said signal having an amplitude being substantially similar to said vibration level of said rotating device 18. The controller of claim 17 wherein said analog circuit means comprises:

clock means, electronically coupled to said digital filter means for defining a center frequency of said filter.

* * * * *